United States Patent [19]

Fish

[11] Patent Number: 5,385,715
[45] Date of Patent: Jan. 31, 1995

[54] SYNTHESIS OF ULTRA-HARD ABRASIVE PARTICLES

[76] Inventor: Michael L. Fish, 17 Knoppiesdoring Street, Randpark Ridge Extension 14, Randpark, Transvaal, South Africa

[21] Appl. No.: 185,092

[22] Filed: Apr. 22, 1988

[30] Foreign Application Priority Data

Apr. 24, 1987 [ZA] South Africa ............... 87/2940

[51] Int. Cl.$^6$ .................................. C30B 29/04
[52] U.S. Cl. .................................. 423/446; 117/929
[58] Field of Search ............... 423/446; 156/DIG. 68; 51/307; 117/929

[56] References Cited

U.S. PATENT DOCUMENTS

| | | | |
|---|---|---|---|
| 2,947,610 | 8/1960 | Hall et al. | 423/446 |
| 3,767,371 | 10/1973 | Wentorf et al. | 423/446 |
| 4,082,185 | 4/1978 | Strong | 423/446 |
| 4,123,504 | 10/1978 | Shulzhenko et al. | 423/441 |
| 4,147,255 | 4/1979 | Ishizuka | 423/446 |
| 4,248,606 | 2/1981 | Boverkerk et al. | 423/446 |
| 4,287,168 | 9/1981 | Wentorf et al. | 423/446 |
| 4,632,817 | 12/1986 | Yazu et al. | 156/DIG. 68 |
| 4,664,705 | 5/1987 | Horton et al. | 156/DIG. 68 |

FOREIGN PATENT DOCUMENTS

| | | | |
|---|---|---|---|
| 37-15766 | 10/1962 | Japan | 423/446 |
| 2017668A | 10/1979 | United Kingdom | 423/446 |
| 600086 | 3/1978 | U.S.S.R. | 423/445 |

OTHER PUBLICATIONS

Chem. Abst., 99: 73061Z; Panczyk, et al. 1983.
Patent Abst. of Japan, vol. 10, No. 71 (C-334) [2128], 1985 to Yatsu.

*Primary Examiner*—Robert Kunemund
*Attorney, Agent, or Firm*—Scully, Scott, Murphy & Presser

[57] ABSTRACT

Friable abrasive particles, particularly diamond particles, are produced by causing suitable material, such as a chloride salt, to be occluded in the particles during their manufacture and then removing some of this material, for example, by leaching.

1 Claim, No Drawings

SYNTHESIS OF ULTRA-HARD ABRASIVE PARTICLES

BACKGROUND OF THE INVENTION

This invention relates to the synthesis of ultra-hard abrasive particles, particularly diamond particles.

Diamonds have been synthesized commercially for several decades and the technology is now very well developed. Diamond synthesis involves subjecting a source of non-diamond carbon, particularly graphite, to temperature and pressure conditions in the diamond stable region of the carbon phase diagram in the presence of a diamond solvent (also known as a catalyst). The conditions for diamond synthesis can be tailored to produce diamonds of a particular shape, size and character. Cubic boron nitride, another ultra-hard abrasive, has also been synthesized commercially for several decades and its technology is now also very well developed. Cubic boron nitride synthesis involves subjecting a source of hexagonal boron nitride to temperature and pressure conditions in the cubic boron nitride stable region of the boron nitride phase diagram in the presence of a suitable catalyst.

SUMMARY OF THE INVENTION

According to the present invention, there is provided a method of producing friable ultra-hard abrasive particles including the steps of subjecting a reaction mass to temperature and pressure conditions suitable for producing the particles, the reaction mass comprising a source material for producing the ultra-hard abrasive particles and a non-metallic material capable of being occluded in the ultra-hard abrasive particles so produced and being removed therefrom, recovering the ultra-hard abrasive particles from the reaction mass, and removing at least some of the occluded material from the abrasive particles.

DETAILED DESCRIPTION OF THE INVENTION

The method of the invention has particular application to the production of friable diamond particles in which event the source material will be non-diamond carbon, particularly graphite, and the temperature and pressure conditions applied will be in the diamond stable region of the carbon phase diagram. The synthesis will take place in the presence of a diamond solvent. Thus, the reaction mass will contain a diamond solvent. Diamond solvents are usually a Group VIII metal or alloy containing such a metal. Diamond solvents and the temperature and pressure conditions used for diamond synthesis are well known in the art and are described, for example, in U.S. Pat. Nos. 2,947,609 and 2,947,610.

The preferred diamond synthesis conditions are temperatures in the range 1450° C. to 1600° C. and pressures in the range 45 to 70 kilobars.

The occluded material is preferably a suitable salt such as a chloride. The preferred chloride is sodium chloride. When the ultra-hard abrasive particles are diamond or cubic boron nitride, the recovery technique usually involves treating the reaction mass with a hot acid solution. This acid solution will dissolve away the diamond or other solvent and will also be suitable for leaching out the occluded material, particularly when that material is a chloride salt. The occluded material typically constitutes up to 30% by weight of the reaction mass.

The occluded material will be removed from the surface of the ultra-hard abrasive particle leaving crevices and holes which assist in creating the friability in the particles. Some of the occluded material will remain trapped in closed pores in the abrasive particle.

The reaction mass will be placed in the reaction zone of a conventional high temperature/high pressure apparatus and then raised to the necessary elevated temperature and pressure conditions. Such apparatus is described, for example, in U.S. Pat. No. 2,941,248.

In an example of the invention, a mixture of a powdered nickel/manganese alloy (76/24), graphite and sodium chloride was placed in a reaction capsule of a conventional high temperature/high pressure apparatus. The ratio of the alloy to graphite was 2:1 on a weight basis. The sodium chloride was present in an amount of 5% by weight expressed as a percentage of the alloy and graphite. The reaction capsule was placed in a conventional high temperature/high pressure apparatus and subjected to a pressure of 60–65 kilobars and a temperature of about 1500° C. These conditions were maintained for a period of 16 minutes. The temperature and pressure conditions were allowed to return to ambient and the reaction capsule removed from the apparatus. The capsule was then placed in a body of a hot acid solution which dissolved the metal leaving a mass of fine diamond particles. It was found that the sodium chloride became occluded in the diamond particles during manufacture and that the sodium chloride in the open pores was leached from the particles by the acid solution leaving crevices and holes in the surfaces of the particles. These crevices and holes assisted in creating the friable nature of the particles. Small amounts of sodium chloride remained in closed pores in the particles.

In further examples, diamond particles were produced using the same method and apparatus described above except that the sodium chloride content was varied. Diamond particles were produced using a 0.5, 2, 2.5, and 10% by weight sodium chloride based on the alloy and graphite. In each case, friable diamond particles were produced with crevices and holes in the surfaces thereof and some sodium chloride was left in closed pores.

The friable nature of the diamond particles made according to the invention renders them particularly suitable for use in grinding wheels, such as resin bonded grinding wheels. A grinding wheel consists of a hub around which is located a working portion. The working portion consists of discrete abrasive particles uniformly distributed through a bonding matrix. In the case of a resin bonded grinding wheel the bonding matrix is a resin.

Friable diamond particles produced as described above and using a reaction mass containing 5% by weight of sodium chloride were incorporated into a number of resin bonded grinding wheels. A second set of resin bonded grinding wheels was produced except that the diamond particles used were standard RD (resin bond) friable diamond particles. Two of the wheels in each set contained diamond particles in the range 88 to 105 microns, and two of the wheels in each set contained diamond particles containing 125 to 149 microns in size.

The grinding ratio of each wheel was determined. The grinding ratio is the ratio of the amount of workpiece removed to the amount of grinding wheel removed. The higher the grinding ratio the better the grinding wheel and hence the more effective the diamond particle in the wheel. In all instances, the diamond particles produced by the method of the invention out-performed the standard RD friable diamond particles. The results obtained are set out in the Table below. The grinding ratios of the wheels containing the particles produced by the invention are expressed as a percentage of the corresponding grinding wheel using conventional RD friable diamond particles.

TABLE

| Wheel | Particle Size | Wet/Dry | Normalised Grinding Ratio |
|---|---|---|---|
| 1 | 88–105 | Wet | 145 |
| 2 | 88–105 | Dry | 150 |
| 3 | 125–149 | Wet | 143 |
| 4 | 125–149 | Dry | 163 |

It will be seen from the above that in all examples, whether the grinding conditions were wet or dry, grinding wheels containing the diamond particles produced by the method of the invention had a higher grinding ratio to those using conventional RD friable diamond particles and hence out-performed these wheels.

I claim:

1. A method of producing friable diamond particles including the steps of subjecting a reaction mass to temperature and pressure conditions suitable for producing the particles, the reaction mass comprising a source material for producing diamond, a metallic diamond solvent and sodium chloride capable of being occluded in the diamond particles so produced and being removed therefrom, recovering the diamond particles from the reaction mass, and removing at least some of the occluded material from the diamond particles. (according to claim 1 wherein the chloride salt is sodium chloride.)

* * * * *